(12) United States Patent
Jones et al.

(10) Patent No.: US 11,880,333 B2
(45) Date of Patent: *Jan. 23, 2024

(54) PERIPHERAL COMPONENT INTERCONNECT (PCI) BACKPLANE CONNECTIVITY SYSTEM ON CHIP (SOC)

(71) Applicant: TEXAS INSTRUMENTS INCORPORATED, Dallas, TX (US)

(72) Inventors: Jason A. T. Jones, Richmond, TX (US); Sriramakrishnan Govindarajan, Bangalore (IN); Mihir Narendra Mody, Bangalore (IN); Kishon Vijay Abraham Israel Vijayponraj, Bangalore (IN); Bradley Douglas Cobb, Sugar Land, TX (US); Sanand Prasad, Plano, TX (US); Gregory Raymond Shurtz, Houston, TX (US); Martin Jeffrey Ambrose, Missouri City, TX (US); Jayant Thakur, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/314,313

(22) Filed: May 7, 2021

(65) Prior Publication Data
US 2021/0263883 A1  Aug. 26, 2021

Related U.S. Application Data

(63) Continuation of application No. 16/221,364, filed on Dec. 14, 2018, now Pat. No. 11,030,144.

(51) Int. Cl.
*G06F 15/78* (2006.01)
*G06F 13/10* (2006.01)

(52) U.S. Cl.
CPC .......... *G06F 15/7807* (2013.01); *G06F 13/10* (2013.01); *G06F 15/7864* (2013.01)

(58) Field of Classification Search
CPC .. G06F 15/7807; G06F 13/10; G06F 15/7864; G06F 12/10; G06F 13/404
See application file for complete search history.

(56) References Cited

U.S. PATENT DOCUMENTS 5,734,847 A * 3/1998 Garbus ............... G06F 13/4027
710/1
5,848,249 A * 12/1998 Garbus ................ G06F 13/404
710/1

(Continued)

FOREIGN PATENT DOCUMENTS

JP 2014016749 A 1/2014

OTHER PUBLICATIONS

"PCIe Use Cases for Keystone Devices, High-Performance and Multicore Processors," Application Report SPRABK8 Dec. 2011, Texas Instruments, 17 pages.

(Continued)

*Primary Examiner* — Phong H Dang
(74) *Attorney, Agent, or Firm* — Brian D. Graham; Frank D. Cimino (57) ABSTRACT

An integrated circuit. The integrated circuit comprises an interconnect communication bus and a plurality of peripheral component interconnect (PCI) multi-function endpoints (MFN-EPs) coupled to the interconnect communication bus, each PCI MFN-EP comprising a multiplexing device, a first address translation unit (ATU), and at least one PCI function circuit, each PCI function circuit comprising another ATU and a plurality of base address registers (BARs).

19 Claims, 7 Drawing Sheets

(56) References Cited

U.S. PATENT DOCUMENTS

| | | | |
|---|---|---|---|
| 5,925,099 A * | 7/1999 | Futral | G06F 13/126 |
| | | | 709/200 |
| 7,979,592 B1 | 7/2011 | Pettey et al. | |
| 8,635,430 B2 | 1/2014 | Craddock et al. | |
| 8,995,302 B1 | 3/2015 | Brown et al. | |
| 9,804,988 B1 * | 10/2017 | Ayoub | G06F 13/4022 |
| 9,864,701 B1 | 1/2018 | Khan et al. | |
| 10,031,857 B2 | 7/2018 | Menachem et al. | |
| 11,030,144 B2 * | 6/2021 | Jones | G06F 13/404 |
| 2007/0073955 A1 | 3/2007 | Murray et al. | |
| 2009/0327645 A1 | 12/2009 | Doi | |
| 2013/0232279 A1 | 9/2013 | Adar et al. | |
| 2014/0237155 A1 | 8/2014 | Shoemaker et al. | |
| 2015/0074322 A1 | 3/2015 | Galles | |
| 2016/0077976 A1 | 3/2016 | Raikin et al. | |
| 2016/0098358 A1 | 4/2016 | Cha et al. | |
| 2016/0098365 A1 | 4/2016 | Bshara et al. | |
| 2018/0011651 A1 | 1/2018 | Sankaran et al. | |

OTHER PUBLICATIONS

Supplementary European Search Report and Search Opinion received for EP Application No. 19896675.6 dated Jan. 18, 2022, 9 pages.
Machine Translation for JP2014016749A.
Office Action from Japan Patent Office, dated Sep. 13, 2023.

* cited by examiner

PERIPHERAL COMPONENT INTERCONNECT (PCI) BACKPLANE CONNECTIVITY SYSTEM ON CHIP (SOC)

CROSS-REFERENCE TO RELATED APPLICATIONS

This application is a continuation U.S. patent application Ser. No. 16/221,364 filed Dec. 14, 2018, which is incorporated herein by reference in its entirety.

SUMMARY

In accordance with at least one example of the disclosure, an integrated circuit includes an interconnect communication bus; and a plurality of peripheral component interconnect (PCI) multi-function endpoints (MFN-EPs) coupled to the interconnect communication bus. Each MFN-EP includes an output address translation unit (ATU) configured to translate to a PCI address an address internal to the integrated circuit and at least one PCI function circuit, wherein the at least one PCI function circuit is configured to route communications via the interconnect communication bus to one of the other MFN-EPs of the IC, wherein the at least one PCI function circuit comprises an input ATU configured to translate, to an address internal to the integrated circuit, a PCI address.

In accordance with at least one example of the disclosure, a method of communicating between different peripheral component interconnect root complexes (PCI RCs) includes reading a plurality of memory region configuration definitions by a processor of a backplane integrated circuit (IC), wherein each memory region configuration definition identifies a size of a memory region, identifies an IC communicatively coupled to the backplane IC where the memory region is located, and identifies another IC communicatively coupled to the backplane IC allowed access to the memory region, wherein each IC is communicatively coupled to a different multi-function endpoint (MFN-EP) of the backplane IC and, for each IC allowed access to one of the memory regions, writing the size of the memory region by the processor in a base address register (BAR) of a peripheral component interconnect (PCI) function circuit of the MFN-EP coupled to the IC. The method further includes, for each IC where a memory region is located, configuring a translation register of an output address translation unit (ATU) in the MFN-EP coupled to the IC by the processor with a local address local to the backplane IC and with an address managed by a PCI RC of the IC and, for each IC allowed access to one of the memory regions, configuring a translation register of an input ATU in the PCI function circuit of the MFN-EP coupled to the IC by the processor with a local address local to the backplane IC wherein the translation register of the input ATU is associated to the BAR of the PCI function circuit of the MFN-EP.

In accordance with at least one example of the disclosure, an integrated circuit includes an interconnect communication bus and a plurality of peripheral component interconnect (PCI) multi-function endpoints (MFN-EPs) coupled to the interconnect communication bus, each PCI MFN-EP comprising a multiplexing device, a first address translation unit (ATU), and at least one PCI function circuit, each PCI function circuit comprising another ATU and a plurality of base address registers (BARs).

BRIEF DESCRIPTION OF THE DRAWINGS

For a detailed description of various examples, reference will now be made to the accompanying drawings in which.

DETAILED DESCRIPTION

Peripheral component interconnect (PCI) is an increasingly important technology for promoting communication between computing devices and peripheral devices. A PCI Express (PCIe) system is a development of an earlier PCI system that relies on a serial communication interface: one serial line output from a PCIe host and one serial line input to the PCIe host. A PCI root complex (RC) generates transaction requests on behalf of the PCIe host and manages the PCI address space, translating between the internal addressing used by the PCIe host and the PCI address space. To accomplish the translations, the PCI RC may build a memory map that defines relationships between internal addresses of the PCIe host and addresses in the PCI address space.

Emerging automotive applications are being designed to include multiple systems on a chip (SoCs) that have high communication bandwidths and that rely upon low latency. Peripheral component interconnect express (PCIe) offers low latency and high throughput communications for connecting between these SoCs. Challenges are presented, however, in translating between the independent PCI address spaces of each of the SoCs. Some approaches to interconnecting SOCs with independent PCI address spaces involve switches, but these solutions suffer from drawbacks. Simple switches resort to cascaded connections that increase latency when more than two SoCs are interconnected via a PCI backplane. Complex switches obviate cascaded connections but may be prohibitively expensive. Additionally, both simple and complex switching solutions rely on non-transparent bridge (NTB) ports to translate from the PCI address space of one SoC to the PCI address space of another SoC. The use of such NTB ports interferes with or prevents the restriction of memory access among SoCs—for example, to allow SoC2 to read from a predefined region of SoC1's memory while preventing SoC3 from reading the same predefined region of SoC1's memory.

The present disclosure teaches a PCI backplane integrated circuit (IC) that provides a cost effective inter-SoC PCI communication device that supports the ability of the SoCs to restrict access to their memory. The PCI backplane IC models SoC hosts as separate functions in PCI multifunction endpoints (MFN-EPs). For a first SoC to communicate to a second SoC via the PCI backplane IC, the first SoC communicates to a first PCI function circuit of a first MFN-EP that models the second SoC. The first PCI function circuit of the first MFN-EP communicates via an interconnect communication bus of the PCI backplane IC with a second MFN-EP, and the second MFN-EP passes the communication on to the second SoC. For the first SoC to communicate to a third SoC via the PCI backplane IC, the first SoC communicates to a second PCI function circuit of the first MFN-EP that models the third SoC. The second PCI function circuit of the first MFN-EP communicates via the interconnect communication bus to a third MFN-EP, and the third MFN-EP passes the communication on to the third SoC. For the first SoC to communicate to a fourth SoC via the PCI backplane IC, the first SoC communicates to a third PCI function circuit of the first MFN-EP that models the fourth SoC. The third PCI function circuit communicates via the interconnect communication bus to a fourth MFN-EP, and the fourth MFN-EP passes the communication on to the fourth SoC. For the second SoC to communicate to the first SoC via the PCI backplane IC, the second SoC communicates to a first PCI function circuit of the second MFN-EP that models the first SoC. The first PCI function circuit of the second MFN-EP communicates via the interconnect communication bus with the first MFN-EP, and the first MFN-EP passes the communication on to the first SoC.

Each MFN-EP includes a plurality of PCI function circuits. Each PCI function circuit may be configured to map transactions from the PCI address space of its associated SoC indirectly to a PCI address space of a SoC modeled by that specific PCI function circuit. The MFN-EP further includes an output address translation unit (ATU) to map transactions from other SoCs to the PCI address space of the SoC associated with that MFN-EP. These mappings provide the PCI backplane IC with the ability to restrict access to PCI memory regions of each of the SoCs as configured by each of the SoCs.

This solution provides low latency, high throughput, and transparency, wherein the transparency allows SoCs to restrict access to their memory regions selectively. Because the PCI backplane IC, because it is a single device produced by a single manufacturer, can be more readily qualified for use in automobiles than a multi-device solution.

Figure 1:
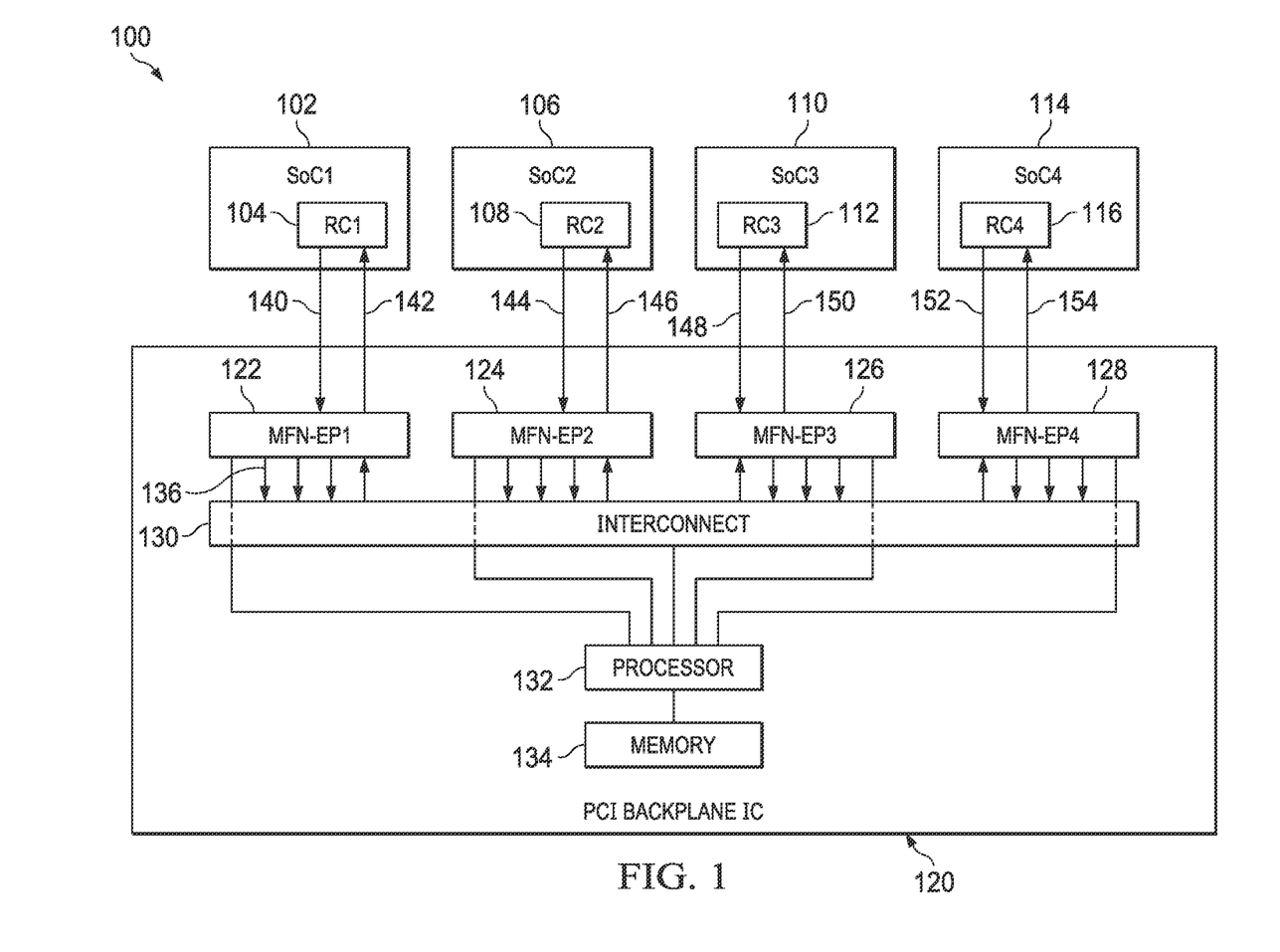
FIG. 1 shows a system having a plurality of systems on a chip (SoCs) interconnected by a peripheral component interconnect (PCI) backplane integrated circuit (IC) in accordance with various examples.

Turning now to FIG. 1, a system 100 is described. In an example, the system 100 includes a first system on a chip (SoC) 102 having a first PCI root complex (RC) 104, a second SoC 106 having a second RC 108, a third SoC 110 having a third RC 112, a fourth SoC 114 having a fourth RC 116, and a peripheral component interconnect backplane integrated circuit (PCI backplane IC) 120. In an example, the PCI backplane IC 120 includes a first multifunction endpoint (MFN-EP) 122, a second MFN-EP 124, a third MFN-EP 126, a fourth MFN-EP 128, an interconnect communication bus 130, a processor 132, and a memory 134. Each of the MFN-EPs 122, 124, 126, 128 is coupled to the interconnect communication bus 130 by a plurality of communication paths 136. The first RC 104 is communicatively coupled to the first MFN-EP 122 by an input line 140 and an output line 142, where the terms "input" and "output" are designated relative to the PCI backplane IC 120. The second RC 108 is communicatively coupled to the second MFN-EP 124 by an input line 144 and an output line 146. The third RC 112 is communicatively coupled to the third MFN-EP 126 by an input line 148 and an output line 150. The fourth RC 116 is communicatively coupled to the fourth MFN-EP 128 by an input line 152 and an output line 154. In an example, each of the lines 140-154 is a serial communication line. In another example, each of the lines 140-154 includes a plurality of parallel conductors.

In some contexts, the SoCs 102, 106, 110, 114 may be referred to as remote SoCs or as remote hosts. In an example, one or more of the SoCs of system 100 may be replaced by a processor that is not a system on a chip. In an example, the PCI backplane IC 120 may have three MFN-EPs instead of four MFN-EPs as illustrated. In an example, the PCI backplane IC 120 may have five or more MFN-EPs instead of four MFN-EPs as illustrated. In an example, the system 100 may be part of an automobile. For example, the SoCs 102, 106, 110, 114 may be remote processors within the automobile that communicate with each other via the PCI backplane IC 120. One of the SoCs 102, 106, 110, 114 may include a camera sensor and support a back-up video functionality of the automobile. One of the SoCs 102, 106, 110, 114 may include a radar processor and support radar sensing and ranging functionality of the automobile (e.g., to support proximity warnings and/or self-driving functionality).

As will be discussed further below, each of the MFN-EPs 122, 124, 126, 128 models a plurality of remote SoCs and provides a communication portal, using that model, to the remote SoCs that it models. For example, the first MFN-EP 122 models each of the SoCs 106, 110, 114 as PCI function circuits and provides the first SoC 102 with a communication portal through which to access the other SoCs 106, 110, 114. The modeling of the SoCs 102, 106, 110, 114 provided by MFN-EPs 122, 124, 126, 128 promote the transparency to SoCs to restrict access to their memory based on the SoC attempting to access the memory, as discussed further hereinafter. This transparency is desirable in some applications, for example where a SoC desires to allow one or more specific other SoC to access its memory but to prohibit another specific SoC from accessing that memory.

The first SoC 102 may complete a transaction involving the second SoC 106 by sending a transaction to the first MFN-EP 122 via the input line 140, where the transaction identifies a PCI function circuit embedded in the first MFN-EP 122 corresponding to the second SoC 106. The transaction is multiplexed by the first MFN-EP 122 to the appropriate PCI function circuit embedded in the first MFN-EP 122, and that PCI function circuit transmits the transaction via the interconnect communication bus 130 to the second MFN-EP 124. The second MFN-EP 124 then completes the transaction with the second SoC 106 via the output line 146. The interconnect communication bus 130 may be referred to as an interconnect. In some cases, a response is returned from a SoC designated by a transaction to the SoC originating the transaction—for example, an acknowledgement token or requested data may be returned.

The processor 132 executes computer-readable instructions stored in the memory 134. The memory 134 includes a non-transitory computer readable storage medium that stores the instructions. The instructions may be stored as software and/or data. The instructions may be stored as firmware. The processor 132 configures the MFN-EPs 122, 124, 126, 128 during initialization of the system 100—for example, managing configuration of sizes of memory regions made accessible by SoCs 102, 106, 110, 114 and configuration of memory maps.

Figure 2:
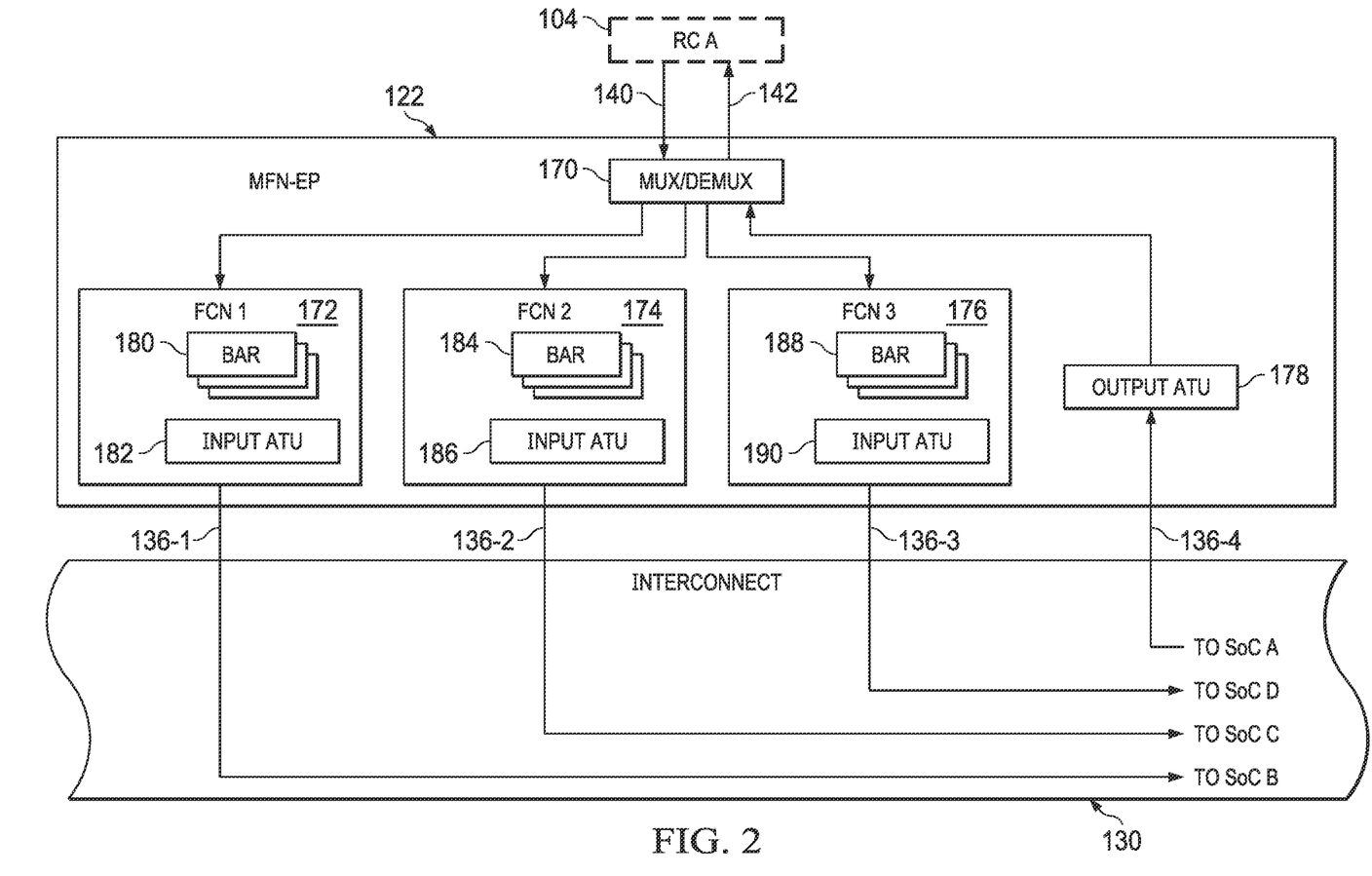
FIG. 2 shows a PCI backplane IC in accordance with various examples.

Turning now to FIG. 2, further details of the MFN-EPs 122, 124, 126, 128 are described. The structure of the first MFN-EP 122 presented in FIG. 2 is representative of the structure of the MFN-EPs 124, 126, 128. In an example, each of the MFN-EPs 122, 124, 126, 128 is instantiated from the same intellectual property core (IP core). An IP core is a block of logic and/or data that is used in making an application specific integrated circuit (ASIC) or field programmable gate array (FPGA). The first MFN-EP 122 includes a multiplexing device 170, a first PCI function circuit 172, a second PCI function circuit 174, a third PCI function circuit 176, and an output address translation unit (ATU) 178. In some contexts, the PCI function circuits 172, 174, 176 may be referred to as function blocks.

The PCI function circuits 172, 174, 176 correspond to a PCI function that the RC 104 may invoke. Each of the PCI function circuits 172, 174, 176 includes a plurality of base address registers (BARs) and an input ATU. The first PCI function circuit 172 includes BARs 180 and an input ATU 182, the second PCI function circuit 174 includes BARs 184 and an input ATU 186, and the third PCI function circuit 176 includes BARs 188 and an input ATU 190. In another example, the MFN-EP 122 includes two PCI function circuits. In another example, the MFN-EP 122 includes four or more PCI function circuits. In an example, each MFN-EP of the PCI backplane IC 120 includes a number of PCI function circuits that is one less than the total number of MFN-EPs in the PCI backplane IC 120. The first PCI function circuit 172 is communicatively coupled to the interconnect communication bus 130 by a communication path 136-1. The second PCI function circuit 174 is communicatively coupled to the interconnect communication bus by a communication path 136-2. The third PCI function circuit 176 is communicatively coupled to the interconnect communication bus by a communication path 136-3. The output ATU 178 is communicatively coupled to the interconnect communication bus by a communication path 136-4.

Each PCI function circuit 172-176 is associated with a specific SoC (e.g., each PCI function circuit 172-176 models a specific SoC to the RC 104). For example, the first PCI function circuit 172 is associated to a SoC B, for example the second SoC 106; the second PCI function circuit 174 is associated to a SoC C, for example to the third SoC 110; and the third PCI function circuit 176 is associated to a SoC D, for example to the fourth SoC 114. Transactions received by the MFN-EP from the RC 104 via the input line 140 are parsed by the multiplexing device 170 to identify which PCI function circuit 172-176 the transaction is directed to (and hence to which SoC the transaction is directed) and then directs the transaction to the identified one of the PCI function circuits 172-176. The PCI function circuit 172-176 uses the BARs 180, 184, 188 and the input ATU 182, 186, 190 to map a PCI address associated with the received transaction to an address offset and to a reference to an entry in the output ATU of the designated MFN-EP. Only transactions that match one of the mappings or translations configured into the BARs 180, 184, 188 and into the input ATUs 182, 186, 190 are routed by the PCI function circuit 172, 174, 176 over the interconnect communication bus. Thus, a SoC 102, 106, 110, 114 can benefit from the transparency provided by the PCI backplane IC 120 to restrict access to its memory by not defining a mapping for a specific SoC to its memory or to a specific region of its memory.

For example, a transaction designating a PCI address in the PCI address space managed by the first RC 104 is directed to the first PCI function circuit 172 (and hence to SoC B or to the second SoC 106). The first PCI function circuit 172 determines which of the plurality of BARs 180 is referenced by the PCI address associated with the received transaction and uses that one of the BARs 180 to index into the input ATU 182 to locate a corresponding local address associating to the output ATU 178 of the second MFN-EP 124. The first PCI function circuit 172 establishes a master-slave relationship with the second MFN-EP 124 over the interconnect communication bus 130 and sends the transaction along with the local address via the communication path 136-1 to the interconnect communication bus 130 and via the interconnect communication bus 130 to the output ATU 178 of the second MFN-EP 124 over the interconnect communication bus 130. In an example, the interconnect communication bus 130 may be an electronic crossbar switch or an electronic matrix switch, and the master-slave relationship may be established by configuring switches in the interconnect communication bus 130. The second MFN-EP 124 uses the address offset and the index into the output ATU 178 to determine a PCI address in the PCI address space managed by the second RC 108 to which to route the transaction to the second RC 108 of the second SoC 106 and sends the transaction via the multiplexing device 170 and via the output communication path 146 to the second RC 108 of the second SoC 106. In this way, a transaction from the RC 104 is transmitted by an originating SoC to a designated SoC. Further details about how transactions are interconnected among SoCs 102, 106, 110, 114 are provided below along with an extended example of configuration of the BARs 180, 184, 188, configuration of the input ATUs 182, 186, 190, and the output ATU 178.

Figure 3:
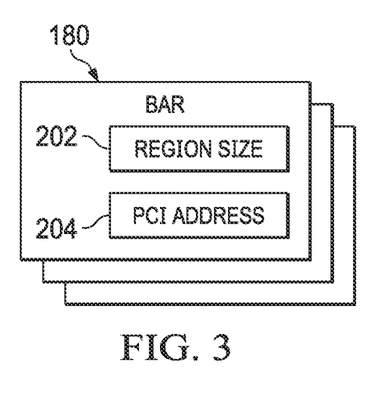
FIG. 3 shows a base address register (BAR) structure in accordance with various examples.

Turning now to FIG. 3, further details of one of the BARs 180 are described. While one of the BARs 180 is described here, the other BARs of the BARs 180, the BARs 184, and the BARs 188 have like structures. An instance of the BARs 180 includes a memory region size parameter 202 and a PCI address parameter 204. In an example, the instance of the BARs 180 includes a region size parameter 202 that may be configured by the processor 132 during initialization of the system 100 to contain the size of a region of memory exported or made accessible by the SoC associated with the BARs 180 (recall that the BARs 180 are contained within a specific one of PCI function circuits 172-176 and the specific PCI function circuit is associated to a specific one of SoCs 102, 106, 110, 114). In an embodiment, the PCI backplane IC 120 supports SoCs 102, 106, 110, 114 each making accessible up to 1 GB of memory. In an embodiment, the PCI backplane IC 120 supports SoCs 102, 106, 110, 114 each making accessible up to a maximum of 2 GB of memory. In an embodiment, the PCI backplane IC 120 supports SoCs 102, 106, 110, 114 each making accessible up to a maximum of 5 GB of memory. In an embodiment, the PCI backplane IC 120 supports SoCs 102, 106, 110, 114 each making accessible up to a maximum of 10 GB of memory. In an embodiment, one of the SoCs 102, 106, 110, 114 contains one or more memory regions that it makes accessible to one or more of the others of the SoCs 102, 106, 110, 114. SoCs 102, 106, 110, 114 can make less than the maximum amount of memory accessible. For example, if the PCI backplane IC 120 supports SoCs 102, 106, 110, 114 each making a maximum of 2 GB of memory accessible, any of those SoCs 102, 106, 110, 114 may make 10 kB of memory accessible, 100 kB of memory accessible, 1 MB of memory accessible, or no memory accessible.

In an embodiment, the MFN-EPs 122, 124, 126, 128 are each configured to communicate to an external PCI address space that is a large outbound memory region containing one or more regions. In an embodiment, the MFN-EPs 122, 124, 126, 128 are each configured to communicate to an external PCI address space of a maximum of 1 GB of memory. In an embodiment, the MFN-EPs 122, 124, 126, 128 are each configured to communicate to an external PCI address space of a maximum of 2 GB of memory. In an embodiment, the MFN-EPs 122, 124, 126, 128 are each configured to communicate to an external PCI address space of a maximum of 5 GB of memory. In an embodiment, the MFN-EPs 122, 124, 126, 128 are each configured to communicate to an external PCI address space of a maximum of 10 GB of memory.

The PCI address parameter 204 may be configured during initialization of the system 100 to associate a PCI address in the PCI address space managed by the RC 104, 108, 112, 116 of the SoC 102, 106, 110, 114 to which the MFN-EP 122, 124, 126, 128 containing the BARs 180 is coupled (recall that the BARs 180 are contained within a specific one of the PCI function circuits 172-176 which is itself contained within a specific one of the MFN-EPs 122, 124, 126, 128, and that specific one of the MFN-EPs 122, 124, 126, 128 is coupled to an RC 104, 108, 112, 116 of a specific one of the SoCs 102, 106, 110, 114). The PCI address may be provided and programmed into a BAR of the BARs 180 by the RC 104, 108, 112, 116 of the SoC 102, 106, 110, 114 to which the MFN-EP 122, 124, 126, 128 containing the BARs 180 is coupled. If the memory region size parameter 202 of one of the BARs 180, 184, 188 has a null value or a zero value, the processor 132 may not allow provisioning a value into the PCI address parameter 204 of that BAR. In part, this is a way for a SoC 102, 106, 110, 114 to restrict access to its memory space. If a first SoC does not provide a value to the memory region size parameter 202 of any of the BARs of the PCI function circuit associated with a second SoC, the second SoC is effectively prohibited from accessing any memory of the first SoC.

Figure 4:
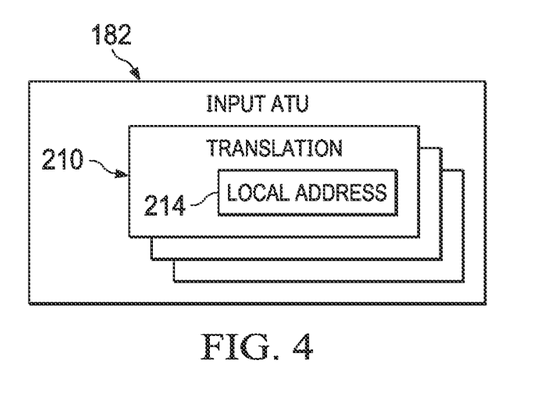
FIG. 4 shows an input address translation unit (ATU) in accordance with various examples.

Turning now to FIG. 4, further details of the input ATU 182 are described. While the input ATU 182 is described here, the input ATUs 186, 190 have like structures. An input ATU 182 includes a plurality of translation registers 210. Each translation register 210 includes a local address parameter 214. In an example, the translation register 210 also includes a BAR identity. The local address parameter 214 identifies a local address of the PCI backplane IC 120. A local address is an address that is unique within a localized address domain, for example within the PCI backplane IC 120. The local address may be associated by the interconnect communication bus 130 of the PCI backplane IC 120 to a specific one of the MFN-EPs 122, 124, 126, 128 or to a PCI function block within the PCI backplane IC 120. The local address parameter 214 may be configured by the processor 132 during initialization of the system 100 to associate a specific BAR of the BARs 180 of the PCI function circuit of an MFN-EP 122, 124, 126, 128 to a corresponding local address of the PCI backplane IC 120. In an example, one of the BARs 180 associates to a translation register 210 by matching the BAR identity of that BAR to the BAR identity of the translation register 210. A BAR of the BARs 180 may be statically associated to a translation register 210 by hardware identity. For example, a first BAR of the BARs 180 may be predefined to associate to a first translation register 210 in the input ATU 182, and a second BAR of the BARs 180 may be predefined to associate to a second translation register 210 in the input ATU 182, etc.

Figure 5:
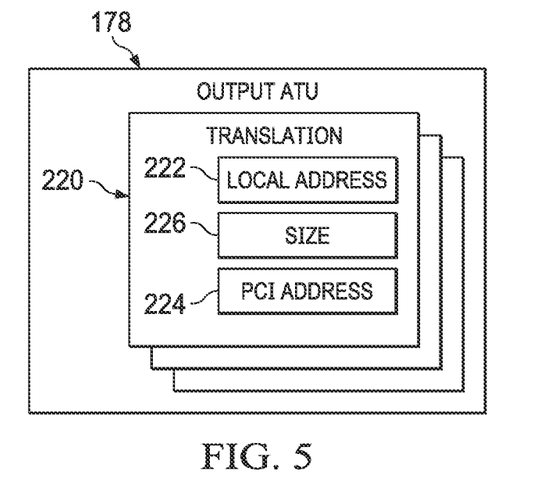
FIG. 5 shows an output ATU in accordance with various examples.

Turning now to FIG. 5, further details of the output ATU 178 are described. An output ATU 178 includes a plurality of translation registers 220. Each translation register 220 includes local address parameter 222, a PCI address parameter 224, and a size parameter 226. The local address parameter 222 and the PCI address parameter 224 may be configured by the processor 132 during initialization of the system 100 to associate the local address value stored in the local address parameter 222 to a PCI address value stored in the PCI address parameter 224. The size parameter 226 may be configured by the processor 132 during initialization of the system 100 to identify a size of the memory region made accessible by the SoC 102, 106, 110, 114 associated to the output ATU 178.

In an example, the number of BARs 180 in each PCI function circuit 172-176 is 3. In an example, the number of translation registers 210 in each input ATU 182 is 3. In an example, the number of BARs 180 in each PCI function circuit 172-176 is 6. In an example, the number of translation registers 210 in each input ATU 182 is 6. In an example, the number of BARs 180 in each PCI function circuit 172-176 is equal to the number of translation registers 210 in each input ATU 182. In an example, the number of translation registers 220 in each output ATU 178 is greater than 12 and less than 96. In an example, the number of translation registers 220 in each output ATU 178 is 16. In an example, the number of translation registers 220 in each output ATU 178 is 32. In an example, the number of translation registers 220 in each output ATU 178 is at least 16. To further clarify the use of the BARs 180, the use of the input ATU 182, and the use of the output ATU 178, an extended example is provided below.

In an example, the memory 134 of the PCI backplane IC 120 is configured in advance with data that defines memory regions and sizes of those memory regions that the SoCs 102, 106, 110, 114 are making accessible. The data also defines to which of the SoCs 102, 106, 110, 114 the regions of memory are accessible. As an example, the memory 134 stores configuration data indicating that the first SoC 102 makes a first region of memory of 25 Kbytes accessible to the second SoC 106 and to the third SoC 110, and makes a second region of memory of 80 Kbytes accessible to the fourth SoC 114. In this example, the configuration data stored in the memory 134 also indicates that the fourth SoC 114 makes a third region of memory of 100 Kbytes accessible to the first SoC 102, a fourth region of memory of 150 Kbytes accessible to the first SoC 102, a fifth region of memory of 75 Kbytes accessible to the second SoC 106, and a sixth region of memory of 125 Kbytes accessible to the second SoC 106.

By defining translations 210 and 220, access by a second SoC to a specific memory region in a first SoC can be granted. On the other hand, by not defining a translations 210 and 220, access by the second SoC to a specific memory region in the first SoC can be prohibited. The translations 210 of the input ATUs 182, 186, 190 and the translations 220 of the output ATUs 178 of the MFN-EPs 122, 124, 126, 128 promote the advantage of transparency for SoCs 102, 106, 110, 114 to control access to their memory regions by other SoCs 102, 106, 110, 114.

In an example, when the PCI backplane IC 120 is powered on, before communication links have been established between the PCI backplane IC 120 and the SoCs 102, 106, 110, 114, the processor 132 reads the memory access permissions from the memory 134 and configures the memory region size parameters 202 in the appropriate BARs 180, 184, 188 of the appropriate MFN-EPs 122, 124, 126, 128. In this example, the first PCI function circuit 172 in each of the MFN-EPs 124, 126, 128 models or is associated with the first SoC 102, and the third PCI function circuit 176 in each of the MFN-EPs 122, 124, 126 models or is associated with the fourth SoC 114. Given the example of configuration data described above, during power on initialization of the PCI backplane IC 120, the memory region size parameter 202 of a BAR of the BARs 180 of the first PCI function circuit 172 of the second MFN-EP 124 is assigned the value of 25 Kbytes, the memory region size parameter 202 of a BAR of the BARs 180 of the first PCI function circuit 172 of the third MFN-EP 126 is assigned the value of 25 Kbytes, and the memory region size parameter 202 of a BAR of the BARs 180 of the first PCI function circuit 172 of the fourth MFN-EP 128 is assigned the value of 80 Kbytes. Continuing this example, the memory region size parameter 202 of a BAR of the BARs 188 of the third PCI function circuit 176 of the first MFN-EP 122 is assigned the value of 100 Kbytes, another BAR of the BARs 188 of the third PCI function circuit 176 of the first MFN-EP 122 is assigned the value of 150 Kbytes, the memory region size parameter 202 of a BAR of the BARs 188 of the third PCI function circuit 176 of the second MFN-EP 124 is assigned the value of 75 Kbytes, and the memory region size parameter 202 of another BAR of the third PCI function circuit 176 of the second MFN-EP 124 is assigned the value of 125 Kbytes.

After the PCI backplane IC 120 has completed its power on initialization, the first SoC 102 and/or first RC 104 establishes communication links with the first MFN-EP 122, the second SoC 106 and/or the second RC 108 establishes communication links with the second MFN-EP 124, the third SoC 110 and/or the third RC 112 establishes communication links with the third MFN-EP 126, and the fourth SoC 114 and/or fourth RC 116 establishes communication links with the fourth MFN-EP 128. During this process of establishing communication links, the MFN-EPs 122, 124, 126, 128 inform the RCs 104, 108, 112, 116 about the values of the memory region size parameters 202 of BARs 180, 184, 188. In this way, the RCs 104, 108, 112, 116 learn what memory regions and the sizes of those memory regions that have been made accessible to them from other SoCs 102, 106, 110, 114. In the example above, the first RC 104 learns that a 100 Kbyte region of memory and a 150 Kbyte region of memory of the fourth SoC 114 have been made accessible to it; the second RC 108 learns that a 25 Kbyte region of memory of the first SoC 102, a 75 Kbyte region of memory of the fourth SoC 114, and a 125 Kbyte region of memory of the fourth SoC 114 have been made accessible to it; the third RC 112 learns that a 25 Kbyte region of memory of the fourth SoC 114 has been made accessible to it; and the fourth RC 116 learns that an 80 Kbyte region of memory of the first SoC 102 has been made accessible to it.

Each of the RCs 104, 108, 112, 116, in response to learning what memory regions and the sizes of those memory regions have been made accessible to them, allocate PCI addresses in their respective PCI address spaces corresponding to these regions of memory made accessible to them and inform the appropriate one of the PCI function circuits 172, 174, 176 of the MFN-EP 122, 124, 126, 128 to which they are communicatively linked. This allocated PCI address is the first in a block of PCI addresses allocated by the RC 104, 108, 112, 116 for communicating to the regions of memory made accessible, where the number of PCI addresses in the block is equal to the corresponding memory region size parameter 202 of the corresponding BAR of the BARs 180.

In the example above, the first RC 104 assigns the start of the third region of PCI address space (made accessible by the fourth RC 116 to the first SoC 102) to PCI address 1000000H (this example value is a hexadecimal number as indicated by the CH' suffix) in the PCI address space managed by the first RC 104 and stores 1000000H in the PCI address parameter 204 of a first BAR of the BARs 188 of the third PCI function circuit 176 of the first MFN-EP 122. The first RC 104 maps the start of the fourth region of PCI address space (made accessible by the fourth RC 116 to the first SoC 102) to PCI address 1020000H in the PCI address space managed by the first RC 104 and stores 1020000H in the PCI address parameter 204 of a second BAR of the BARs 188 of the third PCI function circuit 176 of the first MFN-EP 122. In making this mapping, the first RC 104 leaves enough PCI address space between the 1000000H address and the 1020000H address to accommodate the size of the third region of PCI address space (the 100 Kbytes).

The second RC 108 maps the start of the fifth region of PCI address space (made accessible by the fourth RC 116 to the second SoC 106) to PCI address 1000000H in the PCI address space managed by the second RC 108 and stores 1000000H in the PCI address parameter 204 of a first BAR of the BARs 188 of the third PCI function circuit 176 of the second MFN-EP 124. The second RC 108 maps the start of the sixth region of PCI address space (made accessible by the fourth RC 116 to the second SoC 106) to PCI address 1020000H in the PCI address space managed by the second RC 108 and stores 1020000H in the PCI address parameter 204 of a second BAR of the BARs 188 of the third PCI function circuit 176 of the second MFN-EP 124. In making this mapping, the second RC 108 leaves enough PCI address space between the 1000000H address and the 1020000H address to accommodate the size of the fifth region of PCI address space (the 75 Kbytes). The second RC 108 maps the start of the first region of PCI address space (made accessible by the first RC 104 to the second SoC 106 and to the third SoC 110) to PCI address 1040000H in the PCI address space managed by the second RC 108 and stores 1040000H in the PCI address parameter 204 of the first BAR of the BARs 180 of the first PCI function circuit 172 of the second MFN-EP 124.

The third RC 112 maps the start of the first region of PCI address space (made accessible by the first RC 104 to the third SoC 110 and to the second SoC 106) to PCI address 1000000H in the PCI address space managed by the third RC 112 and stores 10000000H in the PCI address parameter 204 of the first BAR of the BARs 180 of the first PCI function circuit 172 of the third MFN-EP 126. The fourth RC 116 maps the start of the second region of PCI address space (made accessible by the first RC 104 to the fourth SoC 114) to PCI address 8000000H in the PCI address space managed by the fourth RC 116 and stores 8000000H in the PCI address parameter 204 of the first BAR of the BARs 180 of the first PCI function circuit 172 of the fourth MFN-EP 128.

The example addresses above are arbitrary and different addresses could have been used in the examples. Note that the PCI address parameter 204 value (1040000H) of the first BAR of the BARs 180 of the first PCI function circuit 172 of the second MFN-EP 124 is different from the PCI address parameter 204 value (1000000H) of the first BAR of the BARs 180 of the first PCI function circuit 172 of the third MFN-EP 126, even though these two PCI address parameters 204 are associated to the same first region of the PCI address space controlled by the first RC 104. This illustrates the independence between the PCI address spaces managed by each of the separate RCs 104, 108, 112, 116.

The memory 134 of the PCI backplane IC 120 may also be configured with addresses the RCs 104, 108, 112, 116 associate to the memory regions they make accessible to other SoCs 102, 106, 110, 114. During power on initialization of the PCI backplane IC 120, the processor 132 may read these addresses from the memory 134 and configure these addresses into the PCI address parameter 224 of translations register 220 in the output ATUs 178 of the subject MFN-EPs 122, 124, 126, 128. A local address value of the PCI backplane IC 120 can be assigned by the processor 132 to the local address parameter 222 of this translation register 220 associated to the memory region, and the same local address value can be assigned by the processor 132 to the local address parameter 214 of a corresponding translation register 210 in the input ATU 182, 186, 190 of the corresponding one of the PCI function circuits 172, 174, 176 of the appropriate MFN-EP 122, 124, 126, 128 (e.g., MFN-EPs that are associated to SoCs 102, 106, 110, 114 that have been granted access to the memory region). In an alternative example, the RCs 104, 108, 112, 116 can inform the PCI backplane IC 120 during communication link establishment of the PCI addresses to associate to memory regions made accessible by SoCs 102, 106, 110, 114, and the processor 132 can configure the translation registers 220, 210 at that time.

Continuing the example give above, the PCI backplane IC 120 is configured in advance with data indicating the first RC 104 associates PCI address 3000000H with the first memory region it makes accessible to the second SoC 106 and the third SoC 110 and associates PCI address 3080000H with the second memory region it makes accessible to the fourth SoC 114. The PCI backplane IC 120 is configured in advance with data indicating the fourth RC 116 associates PCI address 3000000H with the third memory region it makes accessible to the first SoC 102, PCI address 3040000H with the fourth memory region it makes accessible to the first SoC 102, PCI address 3080000H with the fifth memory region it makes accessible to the second SoC 106, and PCI address 3060000H with the sixth memory region it makes accessible to the second SoC 106. Note that both the first RC 104 and the fourth RC 116 associate memory made accessible to duplicate PCI addresses (3000000H and 3080000H are used by both the first RC 104 and the fourth RC 116), but this is allowed because they are PCI addresses in PCI address spaces independently controlled by each RC respectively.

The PCI backplane IC 120 associates a local address of 183000000H to the PCI address 3000000H and a local address of 183080000H to the PCI address 3080000H of the first RC 104. The PCI backplane IC 120 associates a local address of 303000000H to the PCI address 3000000H, a local address 303040000H to the PCI address 3040000H, a local address 303080000H to the PCI address 3080000H, and a local address 303060000H to the PCI address 3060000H of the fourth RC 116. Note that the PCI backplane IC 120 associates different local addresses to the PCI address 3000000H of the first RC 104 and the PCI address 3000000H of the fourth RC 116 and different local addresses to the PCI address 3080000H of the first RC 104 and the PCI address 3080000H of the fourth RC 116.

The PCI backplane IC 120 configures a first translation register 220 of the output ATU 178 of the first MFN-EP 122 to store 183000000H in its local address parameter 222 and to store 3000000H in its PCI address parameter 224. This first translation register 220 corresponds to the first memory region made accessible by the first SoC 102 to the second SoC 106 and to the third SoC 110. The PCI backplane IC 120 configures a second translation register 220 of the output ATU 178 of the first MFN-EP 122 to store 183080000H in its local address parameter 222 and to store 3080000H in its PCI address parameter 224. This second translation register 220 corresponds to the second memory region made accessible by the first SoC 102 to the fourth SoC 114. The PCI backplane IC 120 configures a first translation register 210 of the input ATU 182 of the first PCI function circuit 172 of the second MFN-EP 124 to store 183000000H in its local address parameter 214 and configures a first translation register 210 of the input ATU 182 of the first PCI function circuit 172 of the third MFN-EP 126 to store 183000000H in its local address parameter 214. The first translation register 210 of the input ATU 182 of the first PCI function circuit 172 of the second MFN-EP 124 associates to the first BAR of the BARs 180 of the first PCI function circuit 172 of the second MFN-EP 124. The first translation register 210 of the input ATU 182 of the first PCI function circuit 172 of the third MFN-EP 126 associates to the first BAR of the BARs 180 of the first PCI function circuit 172 of the third MFN-EP 126. The PCI backplane IC 120 configures a first translation register 210 of the input ATU 182 of the first PCI function circuit 172 of the fourth MFN-EP 128 to store 183080000H in its local address parameter 214. The first translation register 210 of the input ATU 182 of the first PCI function circuit 172 of the fourth MFN-EP 128 associates to the first BAR of the BARs 180 of the first PCI function circuit 172 of the fourth MFN-EP 128.

The PCI backplane IC 120 may configure the interconnect communication bus 130 to route communication directed to local addresses extending from 180000000H to 1FFFFFFFFH to the first MFN-EP 124. The PCI backplane IC 120 may configure the interconnect communication bus 130 to route communication directed to local addresses extending from 200000000H to 27FFFFFFFH to the second MFN-EP 124. The PCI backplane IC 120 may configure the interconnect communication bus 130 to route communication directed to local addresses extending from 280000000H to 2FFFFFFFFH to the third MFN-EP 126. The PCI backplane IC 120 may configure the interconnect communication bus 130 to route communication directed to local addresses extending from 300000000H to 37FFFFFFFH to the fourth MFN-EP 128. In another example, the PCI backplane IC 120 may configure the interconnect communication bus 130 to route communications according to a different scheme of local address routing than the example provided above.

The PCI backplane IC 120 configures a first translation register 220 of the output ATU 178 of the fourth MFN-EP 128 to store 303000000H in its local address parameter 222 and to store 3000000H in its PCI address parameter 224. The PCI backplane IC 120 configures a second translation register 220 of the output ATU 178 of the fourth MFN-EP 128 to store 303040000H in its local address parameter 222 and to store 3040000H in its PCI address parameter 224. The PCI backplane IC 120 configures a third translation register 220 of the output ATU 178 of the fourth MFN-EP 128 to store 303080000H in its local address parameter 222 and to store 3080000H in its PCI address parameter 224. The PCI backplane IC 120 configures a fourth translation register 220 of the output ATU 178 of the fourth MFN-EP 128 to store 3030B0000H in its local address parameter 222 and to store 30130000H in its PCI address parameter 224.

The PCI backplane IC 120 configures a first translation register 210 of the input ATU 190 of the third PCI function circuit 176 of the first MFN-EP 122 to store 303000000H in its local address parameter 214 and configures a second translation register 210 of the input ATU 190 of the third PCI function circuit 176 of the first MFN-EP 122 to store 303040000H in its local address parameter 214. The first translation register 210 of the input ATU 190 of the third PCI function circuit 176 of the first MFN-EP 122 associates to the first BAR of the BARs 188 of the third PCI function circuit 176 of the first MFN-EP 122, and the second translation register 210 of the input ATU 190 of the third PCI function circuit 176 of the first MFN-EP 122 associates to the second BAR of the BARs 188 of the third PCI function circuit 176 of the first MFN-EP 122.

The PCI backplane IC 120 configures a first translation register 210 of the input ATU 190 of the third PCI function circuit 176 of the second MFN-EP 124 to store 303080000H in its local address parameter 214 and configures a second translation register 210 of the input ATU 190 of the third PCI function circuit 176 of the second MFN-EP 124 to store 3030B0000H in its local address parameter 214. The first translation register 210 of the input ATU 190 of the third PCI function circuit 176 of the second MFN-EP 124 associates to the first BAR of the BARs 188 of the third PCI function circuit 176 of the second MFN-EP 124, and the second translation register 210 of the input ATU 190 of the third PCI function circuit 176 of the second MFN-EP 124 associates to the second BAR of the BARs 188 of the third PCI function circuit 176 of the second MFN-EP 124.

When the BARs 180, 184, 188, the translations register 210 of the input ATUs 182, 186, 190, and the translations register 220 of the output ATUs 178 of the MFN-EPs 122, 124, 126, 128 have been initialized and configured as described above, the PCI backplane IC 120 is ready to route transactions among SoCs 102, 106, 110, 114. An example, using the exemplary configurations described above, of transaction routing is now described.

During operation of the system 100, the SoC 102 sends a transaction via the first RC 104 over the input communication path 140 to PCI address 1000000H to the first MFN-EP 122. This PCI address 1000000H is associated with the first BAR of the BARs 188 of the third function circuit 176 of the first MFN-EP 122, and is the first address in the associated block of PCI addresses. This PCI address is mapped by the input ATU 190 of the third function circuit 176 of the first MFN-EP 122 to the local address 303000000H. The third function circuit 176 of the first MFN-EP 122 sends the transaction onto the interconnect communication bus 130 directed to the local address 303000000H. The interconnect communication bus 130 routes this to the fourth MFN-EP 128. The fourth MFN-EP 128 finds a translation register 220 in its output ATU 178 that maps this local address 303000000H to the PCI address 3000000H. The fourth MFN-EP 128 then sends the transaction to the fourth RC 116 directed to PCI address 30000000H.

The examples above illustrate how SoCs 102, 106, 110, 114 can make regions of their memories accessible to specific other one of the SoCs 102, 106, 110, 114—granting access to some of SoCs 102, 106, 110, 114 and restricting access to others of SoCs 102, 106, 110, 114. This example also illustrates how the PCI address space of one RC 104, 108, 112, 116 can be translated by the PCI backplane IC 120 to the PCI address space of a different RC of RCs 104, 108, 112, 116. This approach provides many advantages over the alternative interconnect technologies which may not support the ability to restrict access to SoCs 102, 106, 110, 114 one-by-one (e.g., allow access to a first region of PCI address space to a first SoC and restrict access to the first region to a second SoC and to other SoCs and allow access to a second region of PCI address space to a second SoC and restrict access to the second region to the first SoC and other SoCs).

Figure 6A:
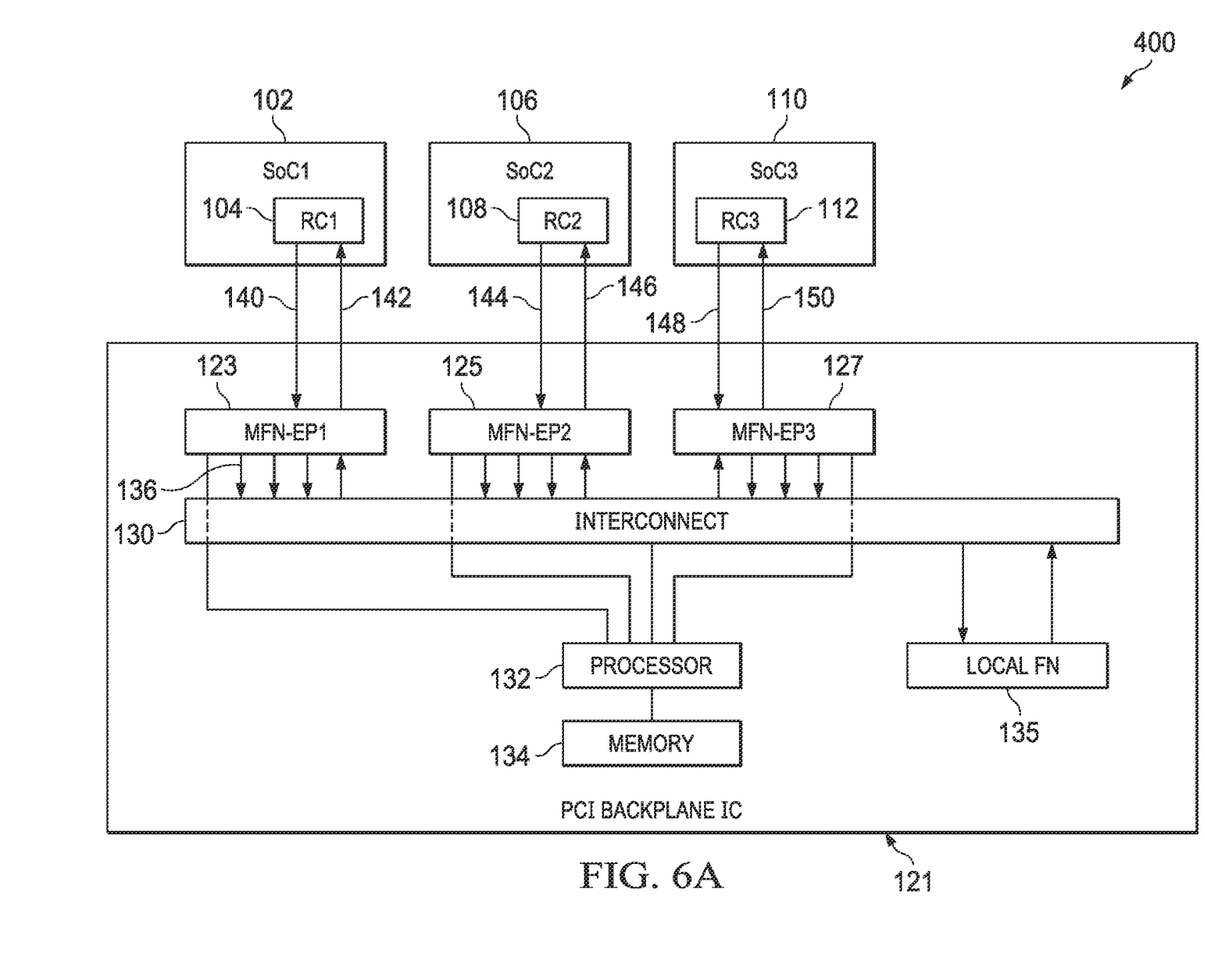
FIG. 6A shows another system having a plurality of SoCs interconnected by a PCI backplane IC in accordance with various examples.
Figure 6B:
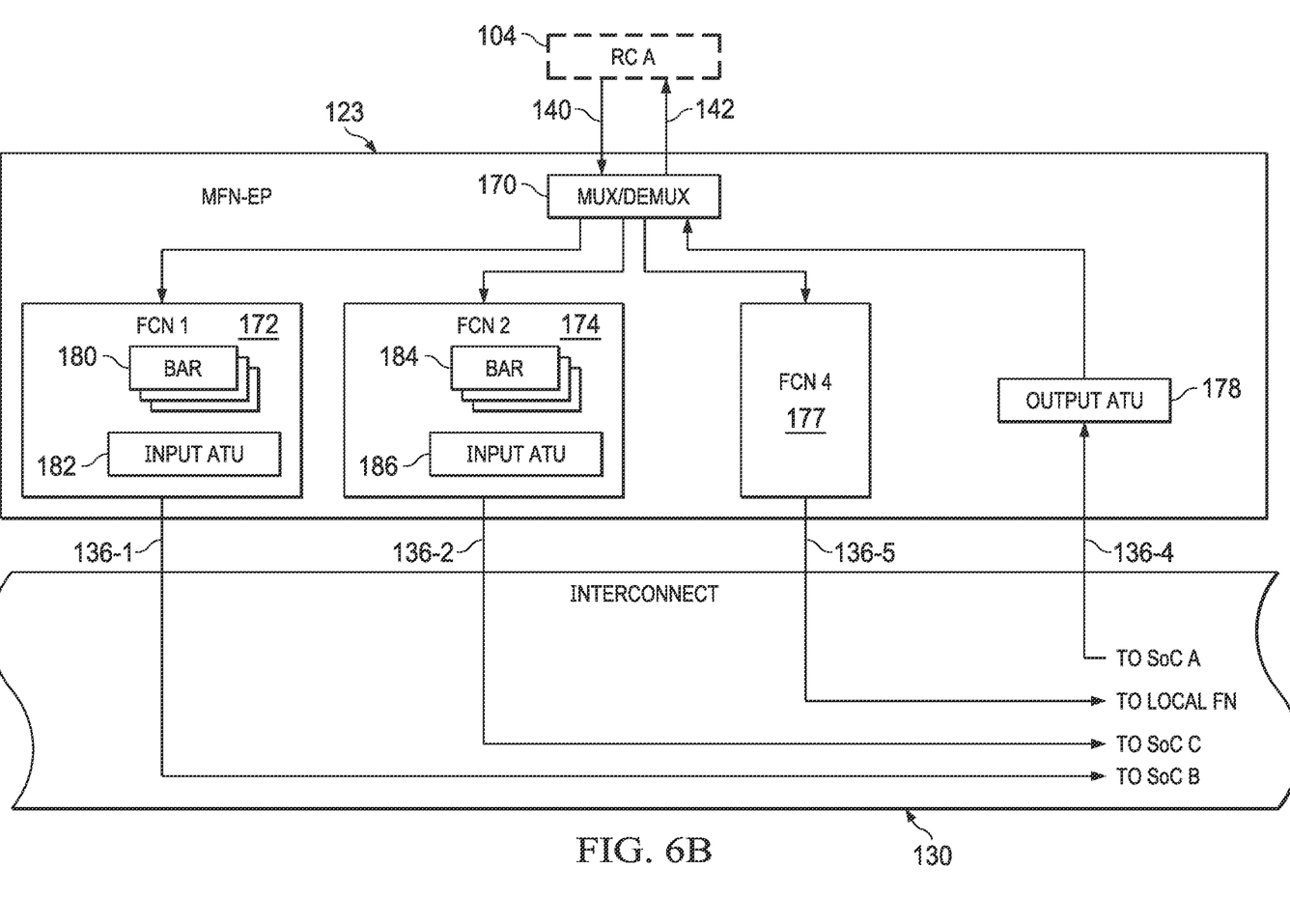
FIG. 6B shows another PCI backplane IC in accordance with various examples.

Turning now to FIG. 6A and FIG. 6B, another example of a PCI backplane IC 121 is described in the context of the system 400. In an example, the PCI backplane IC 121 includes a first multifunction endpoint (MFN-EP) 123, a second MFN-EP 125, a third MFN-EP 127, the interconnect communication bus 130, the processor 132, the memory 134, and a local function circuit 135. The PCI backplane IC 121 shares a number of the same structures as the PCI backplane IC 120, and these like structures operate similarly to the corresponding structures of the PCI backplane IC 120. The local function circuit 135 provides some processing directly, rather than shunting a transaction to a SoC 102, 106, 110 for processing. The local function circuit 135 may be an accelerator processing function. The local function circuit 135 may be an on-chip peripheral. The local function circuit 135 may be an IP block.

With reference now to FIG. 6B, each MFN-EP 123, 125, 127 has a fourth PCI function circuit 177 that receives transactions addressed by the RC 104 to the local function circuit 135 and transmits the transaction via a communication path 136-5 to the interconnect communication bus 130, and via the interconnect communication bus 130 to the local function circuit 135 for processing. In an example, the PCI backplane IC 121 includes two or more local function circuits 135 and two or more MFN-EPs, where each of the MFN-EPs includes a number of PCI function circuits 177 that match the number of local function circuits 135. Note that because PCI transactions inherently identify a function, there is no need to translate an address for the PCI backplane IC 121 to route the transaction to the local function circuit 135.

Figure 7A:
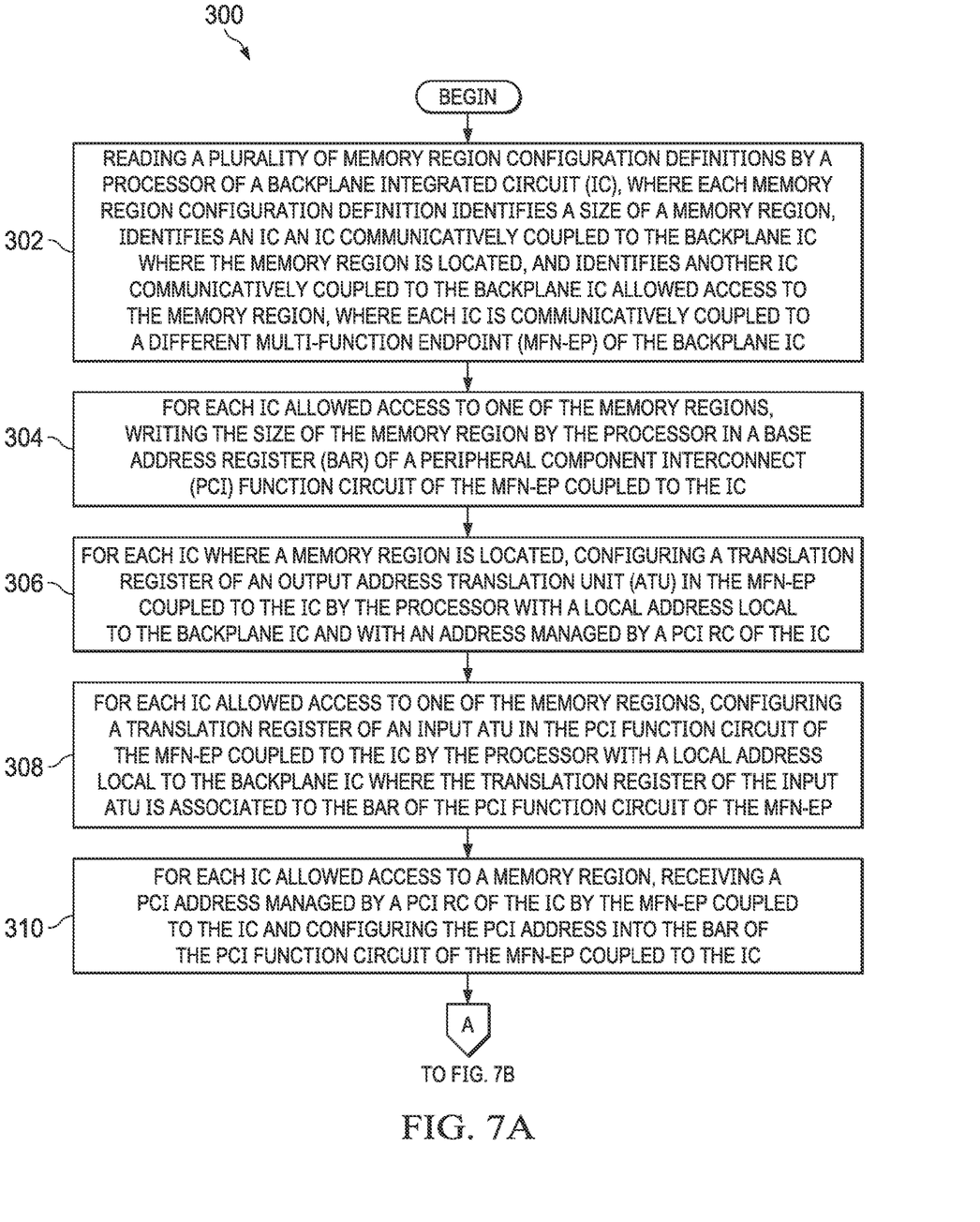
FIG. 7A and FIG. 7B show a flow chart of a method of configuring a PCI backplane IC in accordance with various examples.
Figure 7B:
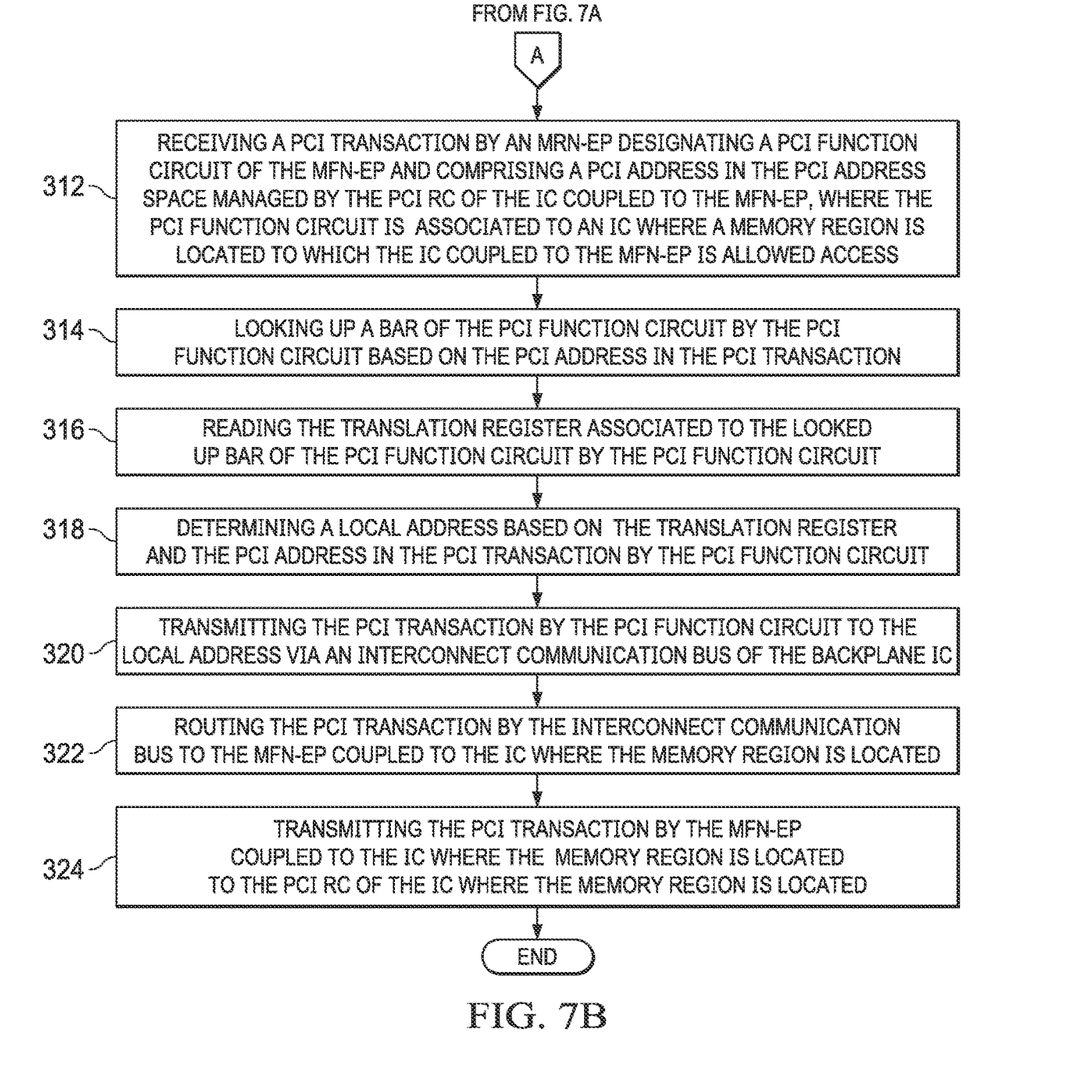

Turning now to FIG. 7A and FIG. 7B, a method 300 of communicating between different peripheral component interconnect root complexes (PCI RCs) is described. The sequence of steps of method 300 span FIG. 7A and FIG. 7B. With reference to FIG. 7A, at block 302, the method 300 includes reading a plurality of memory region configuration definitions by a processor of a backplane integrated circuit (IC) (e.g., processor 132 of PCI backplane IC 120, 121), where each memory region configuration definition identifies a size of a memory region, identifies an IC communicatively coupled to the backplane IC where the memory region is located, and identifies another IC communicatively coupled to the backplane IC allowed access to the memory region, where each IC (e.g., SoCs 104, 106, 110, 114) is communicatively coupled to a different multi-function endpoint (MFN-EP) (e.g., MFN-EPs 122, 124, 126, 128, 123, 125, 127) of the backplane IC. In an example, the backplane IC is the PCI backplane IC 120, 121. In an example, the processor 132 reads the memory configuration definitions from the memory 134. In an example, the processor 132 reads the memory configuration definitions from memory external to the backplane IC.

At block 304, the method 300 includes, for each IC (e.g., SoCs 104, 106, 110, 114) allowed access to one of the memory regions, writing the size of the memory region by the processor in a base address register (BAR) of a peripheral component interconnect (PCI) function circuit of the MFN-EP coupled to the IC. For every memory region exported by an IC, the size of the memory region is programmed by the processor 132 into one or more of the BARs 180, 184, 188 of the corresponding one of the PCI function circuits 172, 174, 176 that models the IC that is making the memory region accessible to the IC to which one of the PCI function circuits 172, 174, 176 is associated.

At block 306, the method 300 includes, for each IC where a memory region is located (e.g., a memory region that a SoC 102, 106, 110, 114 is making accessible to another of the SoCs), configuring a translation register (e.g., translation register 120) of an output address translation unit (ATU) (e.g., ATU 178) in the MFN-EP (e.g., one of MFN-EPs 122, 124, 126, 128, 123, 125, 127) coupled to the IC by the processor (e.g., processor 132) with a local address local to the backplane IC (e.g., PCI backplane ICs 120, 121) and with an address managed by a PCI RC (e.g., one of RCs 104, 108, 112, 116) of the IC. The processing of block 306 can be decomposed as two parts: (A) allocating a local address local to the backplane IC for this memory region made accessible by the IC and (B) configuring the translation register of the ATU in the MFN-EP coupled to the IC.

At block 308, the method 300 includes, for each IC allowed access to one of the memory regions (e.g., one of the memory regions that a SoC 102, 106, 110, 114 is making accessible to another of the SoCs), configuring a translation register (e.g., translation register 210) of an input ATU (e.g., one of input ATUs 182, 186, 190) in the PCI function circuit (e.g., one of the PCI function circuits 172, 174, 176, 177) of the MFN-EP coupled to the IC by the processor with a local address local to the backplane IC where the translation register of the input ATU is associated to the BAR of the PCI function circuit of the MFN-EP.

At block 310, the method 300 includes, for each IC allowed access to a memory region (e.g., a memory region that a SoC 102, 106, 110, 114 is making accessible to another of the SoCs), receiving a PCI address managed by a PCI RC (e.g., one of PCI RC 104, 108, 112, 116) of the IC by the MFN-EP coupled to the IC and configuring the PCI address into the BAR of the PCI function circuit of the MFN-EP coupled to the IC.

With reference now to FIG. 7B, at block 312, the method 300 includes receiving a PCI transaction by an MFN-EP designating a PCI function circuit of the MFN-EP, where the PCI transaction includes a PCI address in the PCI address space managed by the PCI RC of the IC coupled to the MFN-EP, where the PCI function circuit is associated to an IC where a memory region is located to which the IC coupled to the MFN-EP is allowed access.

At block 314, the method 300 includes looking up a BAR of the PCI function circuit by the PCI function circuit based on the PCI address in the PCI transaction. At block 316, the method 300 includes reading the translation register associated to the looked up BAR of the PCI function circuit by the PCI function circuit. At block 318, the method 300 includes determining a local address based on the translation register and the PCI address in the PCI transaction by the PCI function circuit.

At block 320, the method 300 includes transmitting the PCI transaction by the PCI function circuit to the local address via an interconnect communication bus of the backplane IC. At block 322, the method 300 includes routing the PCI transaction by the interconnect communication bus (e.g., interconnect communication bus 130) to the MFN-EP coupled to the IC where the memory region is located. At block 324, the method 300 includes transmitting the PCI transaction by the MFN-EP coupled to the IC where the memory region is located to the PCI RC of the IC where the memory region is located.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A circuit, comprising:
    a first function circuit including:
        a first plurality of registers, each of which is configured to store an address associated with a memory region of a second circuit; and
        a first input address translation unit including a plurality of translation registers, each of which is configured to associate one of the first plurality of registers with a local address that is associated with the second circuit,
    wherein the first function circuit is configured to:
        receive a first transaction directed to the second circuit, wherein the first transaction is associated with a first address;
        determine a first register from the first plurality of registers based on the first address;
        determine a first translation register from the plurality of translation registers based on the first register;
        determine a first local address associated with the second circuit based on the first translation register of the first input address translation unit; and
        transmit the first transaction based on the first local address to the second circuit.

2. The circuit of claim 1, wherein the first function circuit is configured to:
    index the first input address translation unit based on the first register to determine the first local address.

3. The circuit of claim 1, further comprising:
    an interconnect communication bus coupling the circuit with the second circuit; and
    a second function circuit including a second plurality of registers and a second input address translation unit, wherein the second function circuit is configured to:
        receive a second transaction directed to a third circuit, wherein the second transaction is associated with a second address;
        determine a second local address associated with the third circuit based on the second address, the second plurality of registers and the second input address translation unit; and
        transmit the second transaction based on the second local address to the third circuit.

4. The circuit of claim 3, further comprising:
    an output address translation unit configured to receive an output transaction directed to the circuit,
    wherein the output address translation unit includes a plurality of output translation registers, which is configured to store includes an output local address parameter, an address parameter associated with the interconnect communication bus, and a size parameter.

5. The circuit of claim 4, wherein:
    the size parameter identifies a memory size accessible by a device coupled to the circuit.

6. The circuit of claim 5, wherein:
    the memory size is associated with a memory region of the second circuit.

7. The circuit of claim 1, wherein:
    each of the plurality of translation registers is configured to store an input local address parameter and a register identity.

8. The circuit of claim 7, wherein:
    a quantity of the first plurality of registers is equal to a quantity of the plurality of translation registers.

9. A method comprising:
    reading memory region configuration definitions for memory regions, by a processor, wherein each memory region configuration definition identifies a size of a memory region, identifies a device where the memory region is located, and identifies another device allowed access to the memory region;
    for each device allowed access to one of the memory regions, writing the size of the memory region, by the processor, in a base address register (BAR) of a function circuit of an interface circuit coupled to the device, wherein each device is coupled to a different interface circuit;

for each device having one of the memory regions, configuring a translation register of an output address translation unit (ATU) in the interface circuit coupled to the device by the processor with a local address; and for each device allowed access to one of the memory regions, configuring a translation register of an input ATU in the function circuit of the interface circuit coupled to the device by the processor with the local address, wherein the translation register of the input ATU is associated with the BAR of the function circuit of the interface circuit.

10. A method, comprising:

receiving, by a first function circuit, a first transaction from a first circuit directed to a second circuit, wherein the first transaction is associated with a first address;

determining, by the first function circuit, a first register from a plurality of registers based on the first address, wherein each of the plurality of registers stores an address associated with a memory region of the second circuit accessible by the first circuit;

determining, by the first function circuit, a first translation register from a plurality of translation registers of a first input address translation unit based on the first register, wherein each of the plurality of translation registers associates one of the plurality of registers with a local address that is associated with the second circuit;

determining, by the first function circuit, a first local address based on the first translation register of the first input address translation unit; and transmitting, by the first function circuit, the first transaction based on the first local address to the second circuit.

11. The method of claim 10, further comprises:

indexing, by the first function circuit, the first input address translation unit based on the first register to determine the local address.

12. The method of claim 10, wherein:

the first circuit is coupled to the second circuit through an interconnect communication bus.

13. The method of claim 12, further comprising:

receiving, by a second function circuit, a second transaction from the second circuit directed to a third circuit, wherein the second transaction is associated with a second address;

determining, by the second function circuit, a second local address based on the second address, a second plurality of registers and a second input address translation unit of the second function circuit; and transmitting, by the second function circuit, the second transaction based on the second local address to the third circuit.

14. The method of claim 12, further comprising:

receiving, by an output address translation unit of the second circuit, the first transaction, wherein the output address translation unit includes a plurality of output translation registers, wherein each of the plurality of output translation registers stores an output local address parameter, an address parameter associated with the interconnect communication bus, and a size parameter.

15. The method of claim 14, wherein:

the size parameter identifies a memory size accessible by the first circuit.

16. The method of claim 15, wherein:

the memory size is associated with a memory region of the second circuit.

17. The method of claim 10, wherein:

each of the plurality of translation registers stores an input local address parameter and a register identity.

18. The method of claim 13, further comprising:

establishing, by the first function circuit and the second function circuit, a primary-secondary relationship over the interconnect communication bus.

19. The circuit of claim 3, wherein the first function circuit establishes a primary-secondary relationship over the interconnect communication bus with the second function circuit.

* * * * *